United States Patent [19]
Burkhalter et al.

[11] Patent Number: 5,151,131
[45] Date of Patent: Sep. 29, 1992

[54] CEMENT FLUID LOSS CONTROL ADDITIVES AND METHODS

[75] Inventors: John Burkhalter; Jolinda K. Suson, both of Duncan, Okla.

[73] Assignee: Halliburton Company, Duncan, Okla.

[21] Appl. No.: 750,151

[22] Filed: Aug. 26, 1991

[51] Int. Cl.$^5$ .......................... C04B 7/02; C04B 24/00
[52] U.S. Cl. .................................... 106/822; 106/718; 106/719; 106/724; 106/729; 106/730; 106/803; 106/804; 106/805; 106/807; 106/811; 106/823; 106/DIG. 4; 166/293
[58] Field of Search .............. 106/718, 719, 724, 729, 106/730, 803, 804, 805, 807, 811, 822, 823, DIG. 4, 171; 166/293

[56] References Cited

U.S. PATENT DOCUMENTS

| | | | |
|---|---|---|---|
| 4,258,790 | 3/1981 | Hale | 166/293 |
| 4,283,229 | 8/1981 | Girg et al. | 106/171 |
| 4,433,731 | 2/1984 | Chatterji et al. | 166/293 |
| 4,435,217 | 3/1984 | House | 106/171 |
| 4,455,169 | 6/1984 | Chatterji et al. | 106/720 |
| 4,462,836 | 7/1984 | Baker et al. | 106/720 |
| 4,507,420 | 3/1985 | Rosenberger | 568/720 |
| 4,687,516 | 8/1987 | Burkhalter et al. | 106/719 |

*Primary Examiner*—William R. Dixon, Jr.
*Assistant Examiner*—Anthony J. Green
*Attorney, Agent, or Firm*—Thomas R. Weaver

[57] ABSTRACT

Oil field cement liquid fluid loss control additives and methods of field preparing such additives prior to preparing a cement composition containing the additive are provided. The method of field preparing the liquid fluid loss control additive comprises admixing an organophilic clay suspending agent with a liquid hydrocarbon, combining a surfactant with the mixture and then combining at least one hydrophilic polymer with the mixture to form the additive.

4 Claims, No Drawings

CEMENT FLUID LOSS CONTROL ADDITIVES AND METHODS

BACKGROUND OF THE INVENTION

1. Field of the Invention

The present invention relates generally to oil field cement fluid loss control additives, and more particularly, to field prepared liquid fluid loss control additives for use in oil field cement compositions.

2. Description of the Prior Art

Hydraulic cement compositions are commonly utilized in completion and other operations carried out in oil and gas wells. The hydraulic cement compositions utilized are normally field prepared, i.e., prepared at or near the job sites, just prior to their use. Such field preparation generally comprises producing a pumpable slurry at the well site comprising a hydraulic cement, water and various additives. The slurry is then pumped into a subterranean zone to be cemented by way of the well bore penetrating the zone. After placement in the zone, the cement slurry sets into a hard mass.

Hydrophilic polymers have heretofore been utilized as oil field cement composition additives for reducing fluid losses from cement compositions to surrounding subterranean formations as the compositions are being placed or after placement and prior to setting. In primary oil well cementing, a cement composition is placed in the annulus between a casing or liner and the well bore to seal the annulus and bond the casing or liner to the earth formations penetrated by the well bore. If the cement composition loses appreciable fluid, i.e., water, to the earth formations, then premature gelation of the cement composition and bridging of the annulus before proper placement of the cement composition can result. In secondary cementing operations, i.e., remedial cementing operations, the control of fluid loss from cement compositions is necessary to achieve the precise cement composition placement required in such operations.

The hydrophilic polymers commonly utilized as fluid loss agents in cement compositions are dry particulated solids. If such hydrophilic polymers are mixed directly with hydraulic cement and water, and great care and special mixing techniques and apparatus are not utilized, then agglomerated masses known in the art as gel balls and/or fish eyes can be formed. Once formed, gel balls and fish eyes are very difficult to break up and dissolve.

In order to obviate such problems, liquid fluid loss control additives containing hydrophilic polymers have been developed and utilized heretofore. For example, U.S. Pat. No. 4,687,516 issued Aug. 18, 1987 discloses liquid fluid loss control additives for oil field cements which have long storage lives without excessive settling and which can be mixed with cement slurries without the formation of gel balls or fish eyes. While such liquid fluid loss control additives have been made and used successfully, they suffer from the disadvantage that they must be prepared at a location remote from the oil field, transported to warehouses and stored. When used, the liquid additives are transported from storage to well sites in containers and mixed with cement compositions prepared at the sites. While such liquid fluid loss control additives have long storage lives without excessive settling, some settling does take place over extended lengths of time and when too much settling has occurred, difficult and costly reprocessing is required.

The hydrophilic polymer or polymers contained in the heretofore used liquid fluid loss control additives are also commonly utilized directly to form gelled aqueous fluids used in carrying out oil and gas well stimulation and other operations. The hydrophilic polymers in solid form are therefore generally available at well sites. Thus, there is a need for methods of utilizing solid hydrophilic polymers as fluid loss control additives for oil field cements to eliminate the requirement that preformed liquid fluid loss control additives containing such hydrophilic polymers must be stored and transported to the well site and to eliminate the requirement that special mixing techniques and elaborate apparatus must be used for directly mixing the solid hydrophilic polymers with the cements.

SUMMARY OF THE INVENTION

The present invention meets the need described above by providing liquid fluid loss control additives for oil field cements which can be simply and inexpensively field prepared just prior to field preparing a cement composition including the additive.

The method of this invention for preparing a liquid fluid loss control additive for an aqueous cement composition or for other aqueous well treating fluids comprises the steps of admixing an organophilic clay suspending agent with a liquid hydrocarbon such as kerosene or diesel oil. A surfactant is then combined with the clay-liquid hydrocarbon mixture. Thereafter, at least one particulated hydrophilic polymer is combined with the clay-liquid hydrocarbon-surfactant mixture to form the liquid fluid loss control additive. The method of this invention can be performed using conventional oil field mixing apparatus at a location at or near the well site. Upon forming the liquid fluid loss control additive, a cement composition is prepared by mixing the additive with hydraulic cement and sufficient water to form a pumpable slurry using the same or different apparatus from that used to prepare the liquid fluid loss control additive.

It is, therefore, a principal object of the present invention to provide improved oil field cement fluid loss control additives and methods of field preparing the additives and cement compositions containing the additives.

A further object of the present invention is the provision of liquid fluid loss control additives and methods of field preparing such additives which eliminate the need for storing and transporting factory prepared liquid fluid loss control additives and the solids settling problems associated with such additives.

Other and further objects, features and advantages of the invention will be readily apparent to those skilled in the art upon a reading of the description of preferred embodiments which follows.

DESCRIPTION OF PREFERRED EMBODIMENTS

The liquid fluid loss control additives and methods of the present invention are principally for utilization in and with aqueous hydraulic cement compositions. However, as will be understood by those skilled in the art, the additives and methods can be utilized in a variety of other well treating fluids and operations, e.g., in fracturing fluids utilized for fracture stimulating subterranean formations, in drilling fluids utilized in the drilling of well bores, etc. The liquid fluid loss control additives function to reduce fluid loss from well treating fluids to permeable formations during and after placement of the treating fluids in contact with the formations.

The oil field cement compositions in which the use of the liquid fluid loss control additives and methods of the present invention are particularly advantageous are comprised of hydraulic cement, water and other well known and commonly used cement additives such as set retarders, set accelerators, fillers, etc. While various hydraulic cements can be utilized in forming the cement compositions, Portland cements of the various types identified as API classes A-H and J cements are commonly utilized. These cements are identified and defined in *API Specification for Materials and Testing for Well Cements*, API Spec. 10 of the American Petroleum Institute which is incorporated herein by reference.

The liquid fluid loss control additives of this invention are comprised of a liquid hydrocarbon, an organophilic clay suspending agent, a surfactant to strip liquid hydrocarbons from liquid hydrocarbon coated hydrophilic polymers when in contact with water and at least one hydrophilic polymer. When added to an aqueous cement composition, the hydrophilic polymer is dissolved in the water therein and functions to control and reduce water loss from the composition. The liquid additive can be readily and efficiently mixed with a cement slurry or with the water to be used in forming the slurry without the formation of gel balls and/or fish eyes, etc.

The methods of field preparing the liquid fluid loss control additives of this invention basically comprise the steps of admixing an organophilic clay suspending agent with the liquid hydrocarbon used followed by combining the surfactant and hydrophilic polymer with the mixture. Preferably, after mixing the organophilic clay suspending agent with the liquid hydrocarbon, the surfactant (usually a liquid) is mixed therewith followed by mixing the particulate solid hydrophilic polymer therewith.

Various liquid hydrocarbons can be utilized in the additive. Generally, the liquid hydrocarbon should be substantially anhydrous, have a relatively low viscosity and have a high flash point. Suitable such liquid hydrocarbons include kerosene, diesel oil, light mineral oils and oils comprised of aliphatic hydrocarbons having in the range of from about 15 to about 19 carbon atoms.

A variety of hydrophilic polymers, i.e., polymers which are readily water soluble can also be utilized. Generally, the hydrophilic polymers are selected from the group consisting of polysaccharides, polyacrylates, polyacrylamides, biopolymers such as xantham gum, and derivatives thereof; one or more partially sulfonated or carboxylated polymers and mixtures of two or more of such polymers. The sulfonated or carboxylated polymers can be described as being prepared by the caustic catalyzed condensation of formaldehyde with a material such as acetone, naphthalene or a substance derived from acetone or naphthalene, and the resulting polymer reacted with a compound wherein a sufficient amount of sulfonate or carboxyl groups are appended to the polymer to render it water soluble.

The hydrophilic polymers which are preferred for use in accordance with this invention are cellulose derivatives such as hydroxyethylcellulose, hydrolyzed copolymers of acrylamide and 2-acrylamido, 2-methyl propane sulfonic acid, and copolymers of N,N-dimethylacrylamide and 2-acrylamido, 2- methyl propane sulfonic acid. The most preferred polymers are hydroxyethylcellulose, carboxymethylcellulose and carboxymethylhydroxyethylcellulose. The hydrophilic polymer or polymers utilized are combined with and are present in the liquid fluid loss control additive in an amount in the range of from about 40% to about 150% by weight of the liquid hydrocarbon utilized, preferably in an amount in the range of from about 60% to about 110% by weight of the liquid hydrocarbon utilized.

The organophilic clay suspending agents which can be utilized are the reaction products of a smectite clay and an organic ammonium compound, preferably an organic quaternary ammonium salt. The preferred smectite clay is bentonite clay, and the preferred organophilic clays are selected from the group consisting of dimethyl dihydrogenated tallow ammonium bentonite, methylbenzyl dihydrogenated tallow ammonium bentonite, dimethylbenzyl hydrogenated tallow ammonium bentonite and mixtures thereof. A particularly suitable and preferred organophilic clay suspending agent is marketed under the trade designation GS-6 TM by Halliburton Services, a Division of Halliburton Company, of Duncan, Oklahoma. The organophilic clay suspending agent functions to disperse and maintain the solid hydrophilic polymer or polymers in suspension, and is generally present in the additive in an amount in the range of from about 0.5% to about 10% by weight of the liquid hydrocarbon utilized, preferably in an amount in the range of from about 6% to about 8% by weight of the liquid hydrocarbon.

The surfactant for stripping liquid hydrocarbon from the polymer or polymers in the additive when the additive is combined with water or with a composition containing water is preferably selected from the group consisting of aliphatic alcohols having in the range of from about 6 to about 18 carbon atoms reacted with in the range of from about 5 to about 10 moles of ethylene oxide per mole, and octyl, nonyl and dodecyl phenol reacted with in the range of from about 4 to about 20 moles of ethylene oxide per mole. The most preferred such surface active agent is nonylphenol reacted with about 10.5 moles of ethylene oxide. The surfactant is combined with and is present in the additive in the general amount in the range of from about 0.5% to about 8% by weight of the hydrocarbon liquid, preferably from about 3% to about 5% by weight of liquid hydrocarbon.

A particularly preferred method of field preparing a liquid fluid loss control additive for oil field cement comprises the steps of first admixing an organophilic clay suspending agent comprised of the reaction product of bentonite clay with an organic quaternary ammonium compound with a liquid hydrocarbon selected from the group consisting of kerosene and diesel oil. The organophilic clay suspending agent is mixed with the liquid hydrocarbon in an amount in the range of from about 6% to about 8% by weight of the liquid hydrocarbon. Next, a surfactant for stripping hydrocarbons from hydrophilic polymers when in contact with water, preferably nonylphenol reacted with about 10.5 moles of ethylene oxide, is combined with the clay-hydrocarbon mixture in an amount in the range of from about 3% to about 5% by weight of liquid hydrocarbon in the mixture. Finally, at least one hydrophilic polymer is combined with the liquid hydrocarbon mixture to form the liquid fluid loss control additive. The hydrophilic polymer is preferably selected from the group consisting of hydroxyethylcellulose, carboxymethylcellulose and hydroxyethylcarboxymethylcellulose, and is combined with the liquid hydrocarbon mixture in an amount in the range of from about 16% to about 110% by weight of the liquid hydrocarbon.

The liquid fluid loss control additive of this invention is prepared in close proximity to the site of the well in which it is to be used. Generally, the liquid fluid loss control additive is field prepared using conventional oil field mixing apparatus just prior to he preparation of the aqueous cement composition or other aqueous well treating fluid to which it is to be added. When the additive is utilized in an aqueous cement composition, the additive can be combined with the aqueous cement slurry after it is formed or it can be combined with the water used prior to mixing it with the hydraulic cement using the same or different conventional oil field mixing apparatus.

The aqueous cement compositions in which the additives of this invention are utilized ar most commonly comprised of an oil field hydraulic cement such as one of the API classes A-H and J cement, water such as fresh water, salt water or sea water and other commonly used additives such as accelerators, retarders, fillers, etc.

In order to facilitate a clear understanding of the liquid additives of this invention and the methods of their preparation, the following examples are given.

EXAMPLE

Liquid fluid loss control additives of the present invention are prepared using kerosene, diesel oil and in some cases environmentally clean oil, hydroxyethylcellulose (HEC), carboxymethylhydroxyethylcellulose (CMHEC) and a copolymer of 2-acrylamido, 2-methyl propane sulfonic acid and N,N-dimethylacrylamide (AMPS TM /NNDMA). The amounts of the components used were as follows:

|  | Amount |
|---|---|
| 50% Active Additives |  |
| Kerosene, diesel oil (No. 2), Vista LPA-210[1] or BP 8313[2] | 100 gm |
| Organophilic clay suspending agent[3] | 6 gm |
| Surfactant[4] | 4 gm |
| HEC or CMHEC | 110 gm |
| 35% Active Additives |  |
| Kerosene, diesel oil (No. 2), Vista LPA-210[1] or BP 8313[2] | 100 gm |
| Organophilic clay suspending agent[3] | 8 gm |
| Surfactant[4] | 4 gm |
| AMPS TM /NNDMA | 60 gm |

[1]Environmentally clean oil commercially available from Vista Chemical Co.
[2]Environmentally clean oil commercially available from BP Chemicals.
[3]Smectite clay reacted with an organic ammonium compound commercially available from Halliburton Services of Duncan, Oklahoma under the tradename GS-6 TM.
[4]Nonylphenol reacted with about 10.5 moles of EO.

The oil used was measured into a Waring blender followed by the organophilic clay suspending agent. After mixing for about 1 minute, the surfactant was added and after mixing for another minute the polymer used was added. The resulting liquid fluid loss control additive was then mixed for 1 additional minute.

The various liquid fluid loss control additives described above were included in cement compositions which were then tested for Fluid Loss, Thickening Time and Compressive Strength in accordance with API standard methods (API RP-10B). Cement compositions containing the same polymers added directly thereto in solid form were also tested and compared with the liquid additives. The results of these tests are given in Tables 1 through 4 below.

TABLE 1

Comparison of HEC Liquid and Solid Fluid Loss Control Additives in Cement Compositions[1]

| Fluid Loss Control Additive | 100° F. Atmospheric Consistometer (Bc) | | 100° F. Fluid Loss at 1000 psi/325 m.s. cc's/30 min. (doubled) | Thickening Time API Sch 5-125° F. (Hr:Min.) | Compressive Strength 100° F./24 Hr/Atm. (psi) |
|---|---|---|---|---|---|
| | Initial | 20 min. | | | |
| Solid | 6 | 6 | 40 | 5:03 | 1581 |
| Liquid w/ Kerosene | 6 | 6 | 68 | 3:42 | 1047 |
| Liquid w/ Diesel | 7 | 8 | 60 | — | — |

[1]Premium Cement (Low Water), 0.8% HEC by wt. of cement and 5 gal/sk water; 15.8 lb/gal, 1.15 cu ft/sk

TABLE 2

Comparison of HEC Liquid and Solid Fluid Loss Control Additives in Cement Compositions[1]

| Fluid Loss Control Additive | 190° F. Atmospheric Consistometer (Bc) | | 100° F. Fluid Loss at 1000 psi/325 m.s. cc's/30 min. (doubled) | Thickening Time API Sch 5-125° F. (Hr:Min.) | Compressive Strength 100° F./6 days/Atm. (psi) |
|---|---|---|---|---|---|
| | Initial | 20 min. | | | |
| Solid | 5 | 7 | 40 | 4:51 | 5220 |
| Liquid w/ BP 8313 | 6 | 8 | 44 | 4:47 | 4510 |
| Liquid w/ Vista LPA-210 | 6 | 8 | 48 | 4:26 | 4160 |

[1]Premium Cement (Low Water), 0.8% HEC by wt. of cement and 5 gal/sk water; 15.8 lb/gal, 1.15 cu ft/sk

TABLE 3

Comparison of CMHEC Liquid and Solid Fluid Loss Control Additives in Cement Compositions[1]

TABLE 3-continued

| Fluid Loss Control Additive | 100° F. Atmospheric Consistometer (Bc) Initial | 100° F. Atmospheric Consistometer (Bc) 20 min. | 190° F. Fluid Loss at 1000 psi/325 m.s. cc's/30 min. (doubled) | Thickening Time API Sch 5–125° F. (Hr:Min.) | Compressive Strength 190° F./48 Hr/Atm. (psi) |
|---|---|---|---|---|---|
| Solid | 5 | 10 | 78 | 6:15 | 3166 |
| Liquid w/ Kerosene | 4 | 7 | 153 | 4:30 | 2546 |

[1]Premium Cement (Low Water), 35% by wt. of cement Silica Flour, 1% by wt. of cement CMHEC and 5.2 gal/sk water; 16.5 lb/gal, 1.38 cu ft/sk

TABLE 4

Comparison of AMPS ™/NNDMA Liquid and Solid Fluid Loss Control Additives in Cement Compositions[1]

| Fluid Loss Control Additive | 125° F. Atmospheric Consistometer (Bc) Initial | 125° F. Atmospheric Consistometer (Bc) 20 min. | 125° F. Fluid Loss at 1000 psi/325 m.s. cc's/30 min. (doubled) | Thickening Time API Sch 5–140° F. (Hr:Min.) |
|---|---|---|---|---|
| Solid | 9 | 9 | 46 | 4:15 |
| Liquid w/ Kerosene | 9 | 9 | 24 | 2:32 |

[1]Premium Cement (Low Water), 0.6% by wt. of cement AMPS ™/NNDMA and 5 gal/sk water; 15.8 lb/gal, 1.15 cu ft/sk From the test data set forth in the above Tables it can be seen that the liquid fluid loss control additives of the present invention function effectively.

The present invention, therefore, is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A liquid fluid loss control additive for an aqueous well cement composition wherein said additive consists of:
   a liquid hydrocarbon,
   an organophilic clay suspending agent present in said additive in an amount in the range of from about 0.5 to about 10 percent by weight of said liquid hydrocarbon,
   a surfactant present in said additive in an amount in the range of from about 0.5 to about 8 percent by weight of said liquid hydrocarbon, and
   at least one hydrophilic polymer present in said additive in an amount in the range of from about 40 to about 150 percent by weight of said liquid hydrocarbon;
   wherein sad liquid hydrocarbon is selected from the group consisting of kerosene, diesel oil, light mineral oil and oils comprised of aliphatic hydrocarbons having in the range of from about 15 to about 19 carbon atoms,
   said organophilic clay suspending agent is the reaction product of bentonite clay and an organic quaternary ammonium compound,
   said surfactant is selected from the group consisting of aliphatic alcohols having in the range of from about 6 to about 18 carbon atoms reacted with in the range of from about 5 to about 10 moles of ethylene oxide per mole, and octyl, nonyl and dodecyl phenol reacted with in the range of from about 4 to about 20 moles of ethylene oxide per mole, and
   said hydrophilic polymer is selected from the group consisting of polysaccharides, polyacrylates, polyacrylamides, xantham gum sulfonated polymers, carboxylated polymers and mixtures of such polymers.

2. The liquid fluid loss control additive of claim 1 wherein said liquid hydrocarbon is selected from the group consisting of kerosene and diesel oil, said surfactant is nonylphenol reacted with about 10.5 moles of ethylene oxide, and said polymer is selected from the group consisting of hydroxyethylcellulose, carboxymethylcellulose and carboxylmethylhydroxyethylcellulose.

3. A method of preparing a liquid fluid loss control additive for use with an aqueous well cementing composition, wherein said method is performed at the location of use and just prior to the preparation of said cementing composition and said method consists of the steps of:
   (a) admixing an organophilic clay suspending agent with a liquid hydrocarbon to form a first mixture,
   (b) combining a surfactant with said first mixture to form a second mixture and
   (c) combining at least one hydrophilic polymer with said second mixture to thereby form said liquid fluid loss control additive;
   wherein said liquid hydrocarbon is selected from the group consisting of kerosene, diesel oil, light mineral oil and oils comprised of aliphatic hydrocarbons having in the range of from about 15 to about 19 carbon atoms,
   said organophilic clay suspending agent is the reaction product of bentonite clay and an organic quaternary ammonium compound and is admixed with said liquid hydrocarbon in an amount in the range of from about 0.5 to about 10 percent by weight of said liquid hydrocarbon,
   said surfactant is selected from a group consisting of aliphatic alcohols having in the range of from about 6 to about 18 carbon atoms reacted with in the range of from about 5 to about 10 moles of ethylene oxide per mole, and octyl, nonyl and dodecyl phenol reacted within the range of from about 4 to about 20 moles of ethylene oxide per mole, and is combined with said first mixture in an amount in the range of from about 0.5 to about 8 percent by weight of said liquid hydrocarbon, and
   said hydrophilic polymer is selected from the group consisting of polysaccharides, polyacrylates, polyacrylamides, xantham gum sulfonated polymers, carboxylated polymers and mixtures of such polymers, and is combined with said second mixture in an amount in the range of from about 40 to about 150 percent by weight of said liquid hydrocarbon.

4. The method of claim 3 wherein said liquid hydrocarbon is selected from the group consisting of kerosene and diesel oil, said surfactant is nonylphenol reacted with about 10.5 moles of ethylene oxide and said hydrophilic polymer is selected from the group consisting of hydroxyethylcellulose, carboxymethylcellulose and carboxymethylhydroxyethylcellulose.

* * * * *